(12) United States Patent
Oba et al.

(10) Patent No.: US 7,669,370 B2
(45) Date of Patent: Mar. 2, 2010

(54) AUTOMOBILE WEATHER STRIP

(75) Inventors: Kisato Oba, Aichi-ken (JP); Masahiro Nozaki, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 281 days.

(21) Appl. No.: 11/790,015

(22) Filed: Apr. 23, 2007

(65) Prior Publication Data
US 2007/0251153 A1 Nov. 1, 2007

(30) Foreign Application Priority Data
Apr. 24, 2006 (JP) .......................... P-2006-119223

(51) Int. Cl.
*E06B 7/22* (2006.01)
(52) U.S. Cl. ..................... 49/498.1; 49/475.1
(58) Field of Classification Search ................ 49/475.1, 49/490.1, 498.1
See application file for complete search history.

(56) References Cited

U.S. PATENT DOCUMENTS

| | | | |
|---|---|---|---|
| 4,614,347 | A | 9/1986 | Kruschwitz |
| 5,304,409 | A | 4/1994 | Nozaki |
| 5,347,759 | A * | 9/1994 | Kobayashi et al. ......... 49/496.1 |
| 5,449,544 | A | 9/1995 | Ogawa et al. |
| 5,826,378 | A * | 10/1998 | Gallas ....................... 49/498.1 |
| 2005/0120634 | A1 | 6/2005 | Drivon et al. |
| 2006/0138801 | A1 | 6/2006 | Hashimoto et al. |

FOREIGN PATENT DOCUMENTS

| | | |
|---|---|---|
| DE | 10 2004 059 384 A1 | 7/2008 |
| EP | 0 689 952 A1 | 5/1995 |
| JP | 5-338567 | 12/1993 |
| JP | 11-42984 | 2/1999 |
| JP | 2000-16193 | 1/2000 |
| JP | 2000-264072 | 9/2000 |
| JP | 2000-335460 | 12/2000 |
| JP | 2001-341587 | 12/2001 |
| JP | 2003-104068 | 4/2003 |

OTHER PUBLICATIONS

Office Communication dated Oct. 7, 2008.
"Submission of Publication and the like" dated Oct. 7, 2008.
European Search Report dated Jul. 16, 2008.

* cited by examiner

*Primary Examiner*—Jerry Redman
(74) *Attorney, Agent, or Firm*—McGinn IP Law Group, PLLC

(57) ABSTRACT

A weather strip includes an attaching base portion, and a hollow seal portion. The attaching base portion has a generally L-shaped cross-section, and includes a bottom wall and an exterior side wall. An elongation/shrinkage prevention portion is formed such that when the attaching base portion is curved in a direction of a width of the exterior side wall, a neutral axis of curvature is disposed at a position slightly offset toward a widthwise distal end of the exterior side wall from that portion of the exterior side wall continuous with the bottom wall. A double adhesive tape is bonded at least to that portion of an interior surface of the exterior side wall extending toward the distal end of the exterior side wall from a region at which a first hollow connecting portion of the hollow seal portion and the exterior side wall are interconnected.

8 Claims, 6 Drawing Sheets

PRIOR ART

AUTOMOBILE WEATHER STRIP

BACKGROUND OF THE INVENTION

1. Field of the Invention

This invention relates to a weather strip which seals between a opening/closing member (such as an automobile door, a trunk lid and a sliding roof) for opening and closing a vehicle body opening and a peripheral part of the vehicle body opening.

2. Related Art

The present invention will be described taking as an example an opening trim weather strip 10 for sealing between a door 2 of an automobile and a peripheral part 6 of a vehicle body opening as shown in FIG. 3.

Conventionally, a seal between the door 2 and the peripheral part 6 of the vehicle body opening is formed by a door weather strip 160 attached to a retainer 4 mounted on an outer periphery of a door frame of the door 2, a glass run 150 attached to a channel portion 3 formed at an inner periphery of the door frame, and an opening trim weather strip 110 attached to a flange 7 formed at the peripheral part 6 as shown in FIG. 5.

Incidentally, the flange 7 is formed by an outer panel 9 defining the peripheral part 6, an interior inner panel 8, etc.

The glass run 150 includes an exterior side wall 151, a bottom wall 152, and an interior side wall 153, forming a generally U-shaped cross-section to receive an end (or edge) portion of a door glass 5 therein. The glass run 150 holds the end portion of the door glass 5 from opposite sides thereof by an exterior seal lip 154 and an interior seal lip 155 extending respectively from distal ends of the exterior and interior side walls 151 and 153, thereby sealing.

The door weather strip 160 attached to the outer periphery of the door 2 includes an attaching base portion 161, as well as a hollow seal portion 164 and a seal lip portion 166 which are formed integrally on the attaching base portion 161. The attaching base portion 161 is fitted into the retainer 4 formed at the outer periphery of the door frame, and is thus mounted to the door frame. When the door 2 is closed, the seal lip portion 166 contact with a most exterior side end of the peripheral part 6 to seal a gap between the distal end of the door frame and the exterior side end of the peripheral part 6. At this time, the hollow seal portion 164 contact with a bulge portion of the peripheral part 6 disposed on the interior side of the portion of the peripheral part 6 with which the seal lip portion 166 contacts, thereby sealing between the door 2 and the peripheral part 6.

The opening trim weather strip 110 is attached to the flange 7 formed at the opening portion in the vehicle body, and contact with the door frame, etc. to seal between the door 2 and the peripheral part 6, at a region disposed on the interior side of the region where the weather strip 160 contact with the peripheral part 6 for sealing. Namely, the opening trim weather strip 110 is attached to the flange 7 through its attaching base portion 120 of a generally U-shaped cross-section, and its hollow seal portion 130 contact with a bulge portion 2a, etc., of the door frame to seal between the flange 7 and the door 2. A core member 124 such as a metal insert for holding the flange 7 is embedded in the attaching base portion 120, and flange holding lips are formed within the attaching base portion 120.

However, this opening trim weather strip 110 has an increased weight since it has the metal insert or the like, and further this weather strip 110 is formed into such a shape that the flange 7 is inserted into the attaching base portion 120, and therefore a force is required for deforming the flange holding lips, and much time and labor have been required for attaching this opening trim weather strip 110 to the flange 7.

Furthermore, in the case where the opening trim weather strip is attached to the peripheral part 6 of the vehicle body opening which is a vehicle body opening for a side door over the entire periphery thereof, the flange 7 formed at the peripheral part 6 varies in thickness from one region to another, that is, not uniform in thickness over the entire periphery. Namely, the flange 7 is formed by joining distal end portions of a plurality of panels forming the vehicle body, and the number of the panels joined varies from 2 to 5, depending on the region, so that the thickness of the flange varies from about 1.4 mm to about 8 mm.

Therefore, in the case where the core member 24 for reinforcing purposes such as a metal insert is embedded in the attaching base portion 120 of a generally U-shaped cross-section, a force required for fitting the attaching base portion 120 on the flange 7 has increased depending on the region, and also a holding force for the flange 7 has decreased depending on the region. Therefore, attempts have been made to obtain the optimum hardness and shape of the holding lips formed within the attaching base portion 120, but this has been found not entirely satisfactory. Further, the opening trim weather strip 110 increases in weight with the use of the metal insert or the like as described above, and therefore can not meet a demand for a lightweight design of the vehicle.

Therefore, as shown in FIG. 6, there has been proposed a weather strip in which any core member such as a metal insert is not provided in an attaching base portion (trim portion) 220, thereby enhancing its lightweight design and flexibility, and also the weather strip is attached to a flange 7 by the use of a double adhesive tape 225 (see, for example, JP-A-5-338567 Publication and JP-A-2000-335460 Publication). In this case, as shown in FIG. 6, the double adhesive tape 225 is bonded to an inner surface of an exterior side wall 222 of the trim portion 220 of the weather strip 210, and a distal end portion of the flange 7 is inserted in an inclined condition into the interior of the trim portion 220, and the trim portion 220 is rotated or angularly moved about the distal end of the flange 7, so that the double adhesive tape 225 is pressed to be bonded to an exterior side surface of the flange 7.

In this case, one of the two side walls of the trim portion 220 is formed into a shorter size so that the distal end of the flange 7 can be easily inserted into an inner part of the trim portion 220. The double adhesive tape 225 is bonded to the longer side wall, and the distal end of the flange 7 is inserted into the inner part of the trim portion 220 while the trim portion 220 is kept in an inclined condition, and then the trim portion 220 is angularly moved in a direction of an arrow, thereby bonding the double adhesive tape 225 to the side surface of the flange 7, and attaching the weather strip 210 to the flange. More specifically, when the weather strip 210 is to be bonded to the flange 7 by the double adhesive tape 225, a protective tape is peeled off the double adhesive tape 225, and in an inclined condition of the trim portion 220, the distal end of the flange 7 is inserted into the trim portion 220 without contacting an adhesive surface of the double adhesive tape 225, and the trim portion 220 is angularly moved about the distal end of the flange 7, so that the double adhesive tape 225 is pressed to be bonded to the side surface of the flange 7.

This weather strip 210 is designed such that the distal end of the flange 7 is inserted into the trim portion 220, and then the trim portion 220 is angularly moved so as to attach the weather strip 210 to the flange, and therefore even in this weather strip 210, the above insertion and angular movement can not often be properly effected in the case where the plate thickness of the flange 7 varies.

As shown in FIG. 7, in order to absorb a change in the thickness of a flange 7, there has also been proposed an opening trim weather strip 310 in which a trim portion 320 is formed into a generally L-shaped cross-section, and a double adhesive tape 325 is bonded to an inner surface of an exterior side wall 321 of the trim portion 320, and a sound insulating sponge 328 is provided on a bottom wall 326. In this case, the double adhesive tape 325 is pressed to be bonded to an exterior side surface of the flange 7, and a distal end of the flange 7 is sealed by the sound insulating sponge 328.

In this case, when the opening trim weather strip 310 is attached along a corner portion, a hollow seal portion 330 formed on an exterior surface of the exterior side wall 321 is pulled, so that there is exerted a force tending to increase the angle between the exterior side wall 321 and the bottom wall 326 (which jointly form a generally L-shaped cross-section) into an obtuse angle. Therefore, a force is exerted such that the portion of the hollow seal portion 330 connected to the exterior side wall 321 tends to pull the exterior side wall 321 off the flange 7.

However, the double adhesive tape 325 is bonded on the exterior side wall 321 along a projection portion 324 thereof, and therefore is disposed at a root side-portion of the exterior side wall 321. Further, the double adhesive tape 325 is expensive, and therefore in many cases, it is formed into a relatively small width, so that the double adhesive tape 325 does not exist at the distal end of the exterior side wall 321 as shown in FIG. 7. Therefore, the exterior side wall 321 has been liable to be peeled off the flange 7 at the corner portion.

SUMMARY OF THE INVENTION

It is therefore an object of this invention to provide an automobile weather strip in which a double adhesive tape on an exterior side wall is positively prevented from being peeled off a flange even when the weather strip is attached along a curved corner portion, and a stable adhesively-bonding performance is provided by the double adhesive tape.

The above object has been achieved by a weather strip of the first aspect of the invention for sealing between a opening/closing member of a vehicle and a peripheral part of a vehicle body opening of the vehicle, including:

an attaching base portion adapted to be attached to a flange formed at one of the opening/closing member and the peripheral part; and a hollow seal portion formed integrally with the attaching base portion and adapted to contact against the other of the opening/closing member and the peripheral part to seal between the opening/closing member and the peripheral part;

wherein an elongation/shrinkage prevention portion is formed in the exterior side wall such that a neutral plane of curvature when the attaching base portion is curved in a widthwise direction thereof is located at a position closer to a widthwise distal end of the exterior side wall than an interconnecting portion between the exterior side wall and the bottom wall;

the attaching base portion includes at least a bottom wall and an exterior side wall to define a generally L-shaped cross section;

the hollow seal portion includes a sealing contact portion for contacting with the other of the opening/closing member and the peripheral part, a first hollow connecting portion interconnecting one side end of the sealing contact portion and an exterior surface of the exterior sidewall located at a position closer to the widthwise distal end of the exterior side wall than the elongation/shrinkage prevention portion, and a second hollow connecting portion interconnecting another side end of the sealing contact portion and the exterior surface of the exterior side wall located at a root portion of the exterior side wall; and a double adhesive tape is bonded at least to a region on an interior side surface of the exterior side wall defined between a widthwise distal end of the exterior side wall and a portion at which the first hollow connecting portion and the exterior side wall are interconnected.

In the first aspect of the invention, the attaching base portion is attached to one of an outer periphery of a door frame (serving as the opening/closing member) and the peripheral part, and when the opening/closing member is closed, the hollow seal portion is brought into contact with the other of the opening/closing member and the peripheral part to seal between the opening/closing member and the peripheral part.

The attaching base portion includes the bottom wall and the exterior side wall to define the generally L-shaped cross section. Therefore, even when the thickness (wall thickness) of the flange varies, the exterior side wall can be positively attached to a side surface of the flange by the use of the double adhesive tape regardless of the thickness of the flange. A distal end of the flange is held by the bottom wall which is formed integrally with the exterior side wall to assume a generally L-shaped cross-section, and noises and rain water are prevented from intruding through the distal end of the flange.

The elongation/shrinkage prevention portion is formed such that when the attaching base portion is curved in a widthwise direction, the neutral axis of curvature is disposed at the position slightly closer to the widthwise distal end of the exterior side wall than the interconnecting portion of the exterior side wall and the bottom wall. Therefore, when the attaching base portion is attached in a curved manner to a corner portion, the portions of the exterior side wall disposed respectively at the opposite sides of the elongation/shrinkage prevention portion are elongated and shrunk, respectively, and a compressive force acts on the side end portion of the exterior side wall continuous with the bottom wall. Therefore, the bottom wall is bent toward the flange, and is pressed against the distal end of the flange, so that the sealing effect between the flange distal end and the bottom wall is enhanced.

The hollow seal portion includes the sealing contact portion for contacting with the other of the opening/closing member and the peripheral part, the first hollow connecting portion interconnecting the sealing contact portion and the exterior surface of the exterior side wall at a location closer to the widthwise distal end of the exterior side wall than the elongation/shrinkage prevention portion, and the second hollow connecting portion interconnecting the sealing contact portion and the exterior surface of the root portion of the exterior side wall. Therefore, even when there is a variation in dimensions with respect to the mounting of the door on the vehicle body, the hollow seal portion can positively contact with the mating member to seal between the door and the peripheral part.

The double adhesive tape is bonded at least to a region on the interior surface of the exterior side wall defined between the widthwise distal end of the exterior side wall and the position at which the first hollow connecting portion of the hollow seal portion and the exterior side wall are interconnected. Therefore, even when the opening trim weather strip is attached along a curved corner portion of the peripheral part, so that the hollow seal portion is deformed, and the first hollow connecting portion pulls the distal end-side portion of the exterior side wall, the double adhesive tape bonded to the distal end portion is hardly peeled off the flange. Further, the double adhesive tape can be bonded to that portion of the flange near to a root portion thereof, and the double adhesive tape can be bonded to the flange without being affected by spot welding traces on the flange, so that the bonding strength can be increased. Furthermore, the double adhesive tape can be bonded to the flange at the distal end-side portion of the exterior side wall, and even if there is a variation in the position of contact of the flange distal end against the bottom wall, the exterior side wall can be positively pressed to be bonded to the side surface of the flange. In the case where the double adhesive tape is bonded only to the distal end portion, the expensive double adhesive tape can be saved, and the cost can be reduced.

In the second aspect of the weather strip of the invention, the double adhesive tape is bonded to a region on the interior surface of the exterior side wall defined between the widthwise distal end of the exterior side wall and the elongation/shrinkage prevention portion.

In the second aspect of the invention, the distal end of the exterior side wall is hardly peeled off the flange, and further it can be bonded to the side surface of the exterior side wall over a wide area, and can be firmly bonded to the flange even if welding traces are formed on the flange.

In the third aspect of the weather strip of the invention, a sponge layer is formed between the interior surface of the exterior side wall and the double adhesive tape.

In the third aspect of the invention, the sponge layer absorbs irregularities on the side surface of the flange due to spot welding traces or the like, so that the double adhesive tape can be firmly bonded to the exterior side wall.

In the fourth aspect of the weather strip, the elongation/shrinkage prevention portion is made of a material harder than remaining portions of the exterior side wall, and is thickened.

In the fourth aspect of the invention, the elongation/shrinkage prevention portion is less liable to be elongated and shrunk as compared with the other portion of the exterior side wall. When the attaching base portion is attached in a curved manner to the corner portion, the elongation/shrinkage prevention portion positively serves as the neutral axis of curvature. Therefore, at the corner portion, the deformation of the hollow seal portion can be controlled into a predetermined shape.

In the fifth aspect of the weather strip of the invention, a reinforcing thread material or a metal wire is embedded in the elongation/shrinkage prevention portion.

In the fifth aspect of the invention, the amount of elongation and shrinkage of the elongation/shrinkage prevention portion is small, and when the attaching base portion is attached in a curved manner to the corner portion, the elongation/shrinkage prevention portion positively serves as the neutral axis of curvature.

In the case where the metal wire is embedded, the adhesion of the metal wire to the elongation/shrinkage prevention portion is secured by an adhesively-bonding process or the like, and the elongation/shrinkage prevention portion has a low elongation/shrinkage ability and a high strength, and therefore can suppress the elongation and shrinkage of the weather strip. In the case of using the reinforcing thread material, the elongation/shrinkage prevention portion has flexibility, a low elongation/shrinkage ability and a high strength, and therefore can suppress the elongation and shrinkage of the weather strip.

In the sixth aspect of the weather strip of the invention, a widthwise dimension of the double adhesive tape is at least ¼ to 1 of a widthwise dimension of the exterior side wall.

In the sixth aspect of the invention, when the double adhesive tape is bonded to the flange, the high bonding strength can be obtained. If this widthwise dimension is smaller than ¼ of the widthwise dimension of the exterior side wall, a sufficient bonding strength is not obtained, and if it is larger than 1 of the widthwise dimension of the exterior side wall, the double adhesive tape projects from the weather strip, and portions of the double adhesive tape overlap each other to form step portions.

In the seventh aspect of the weather strip of the invention, a concave portion is formed between the portion to which the double adhesive tape is bonded and the elongation/shrinkage prevention portion.

In the seventh aspect of the invention, the spot welding traces formed on the flange and a strain due to the spot welding can be absorbed by this concave portion. Therefore, the bonding strength of the double adhesive tape can be secured.

In the eighth aspect of the invention, the opening/closing member is a door, and the weather strip is an automobile opening trim weather strip.

In the eighth aspect of the invention, a seal can be positively formed between the peripheral part and the door, and the weather strip can positively prevent noises from intruding into the interior of the vehicle through a gap between the flange and the attaching base portion.

In the present invention, the double adhesive tape is bonded to the exterior surface of the exterior side wall, and the double adhesive tape is bonded at least to that portion of the exterior side wall extending toward the widthwise distal end of the exterior side wall from the region at which the first hollow connecting portion of the hollow seal portion and the exterior side wall are interconnected. Therefore, even when the opening trim weather strip is attached the corner portion of the peripheral part, and the first hollow connecting portion pulls the distal end-side portion of the exterior side wall, so that the double adhesive tape bonded to the distal end portion is hardly peeled off the flange. Further, the double adhesive tape can be bonded to the flange without being affected by spot welding traces on the flange, so that the bonding strength can be increased. Furthermore, even if there is a variation in the position of contact of the flange distal end against the bottom wall, the exterior side wall can be positively pressed to be bonded to the side surface of the flange.

DETAILED DESCRIPTION OF THE PREFERRED EMBODIMENTS

Preferred embodiments of the present invention will be described taking a door and an opening trim weather strip 10 as an example. The present invention can be applied not only to the opening trim weather strip 10 but also to any other suitable weather strip such for example as a sliding roof weather strip, a luggage weather strip and a back door weather strip which includes a seal portion for sealing between a opening/closing member of an automobile for closing a vehicle body opening and a peripheral part of the vehicle body opening, and an attaching base portion.

The present invention will now be described with reference to FIGS. 1 to 4.

Figure 1:
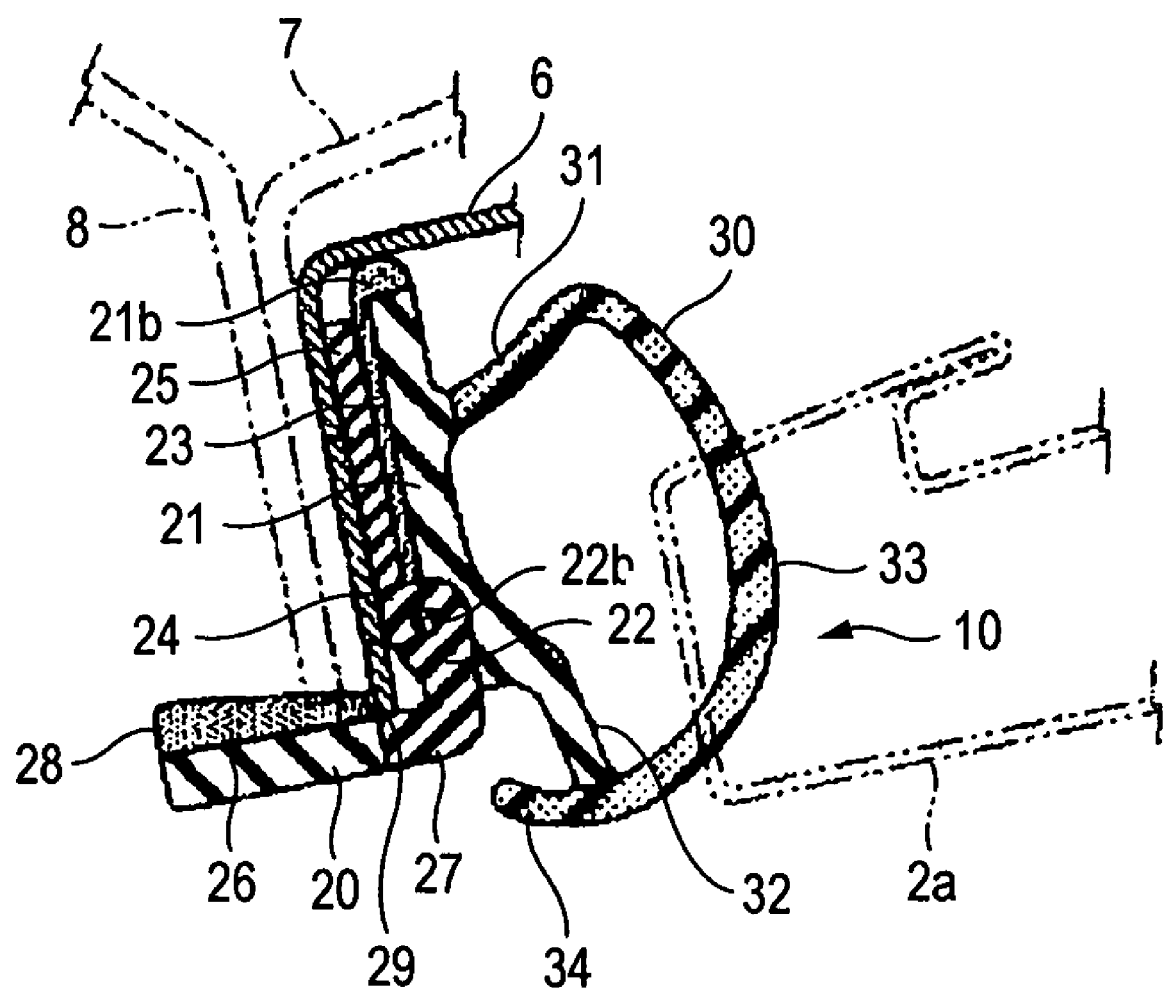
FIG. 1 is a cross-sectional view of a first embodiment of an opening trim weather strip of the present invention taken along the line A-A of FIG. 4, showing a condition in which this weather strip is attached to a peripheral part of a vehicle body opening.
Figure 3:
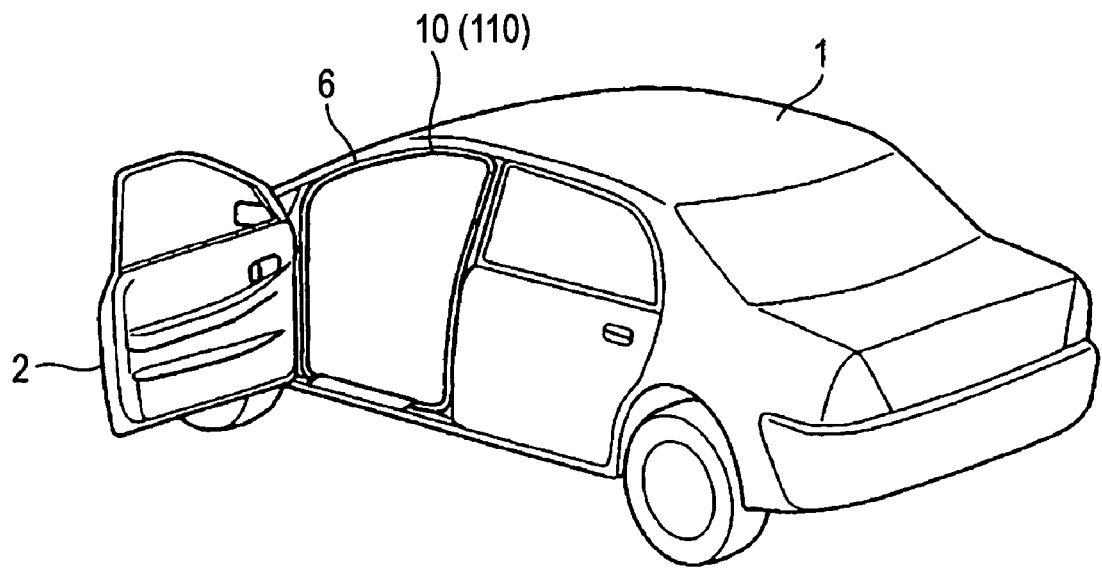
FIG. 3 is a perspective view of a vehicle body of an automobile as seen from a rear side of a side surface of the automobile.
Figure 4:
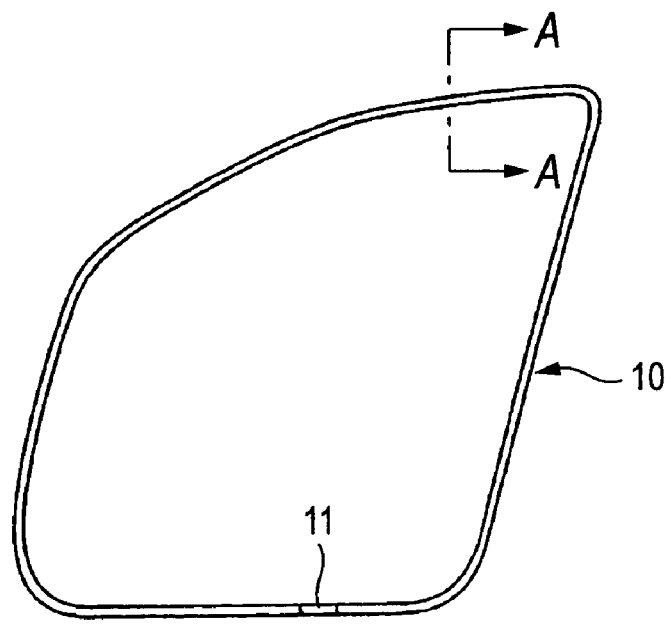
FIG. 4 is a front-elevational view showing the opening trip weather strip of the invention.
Figure 5:
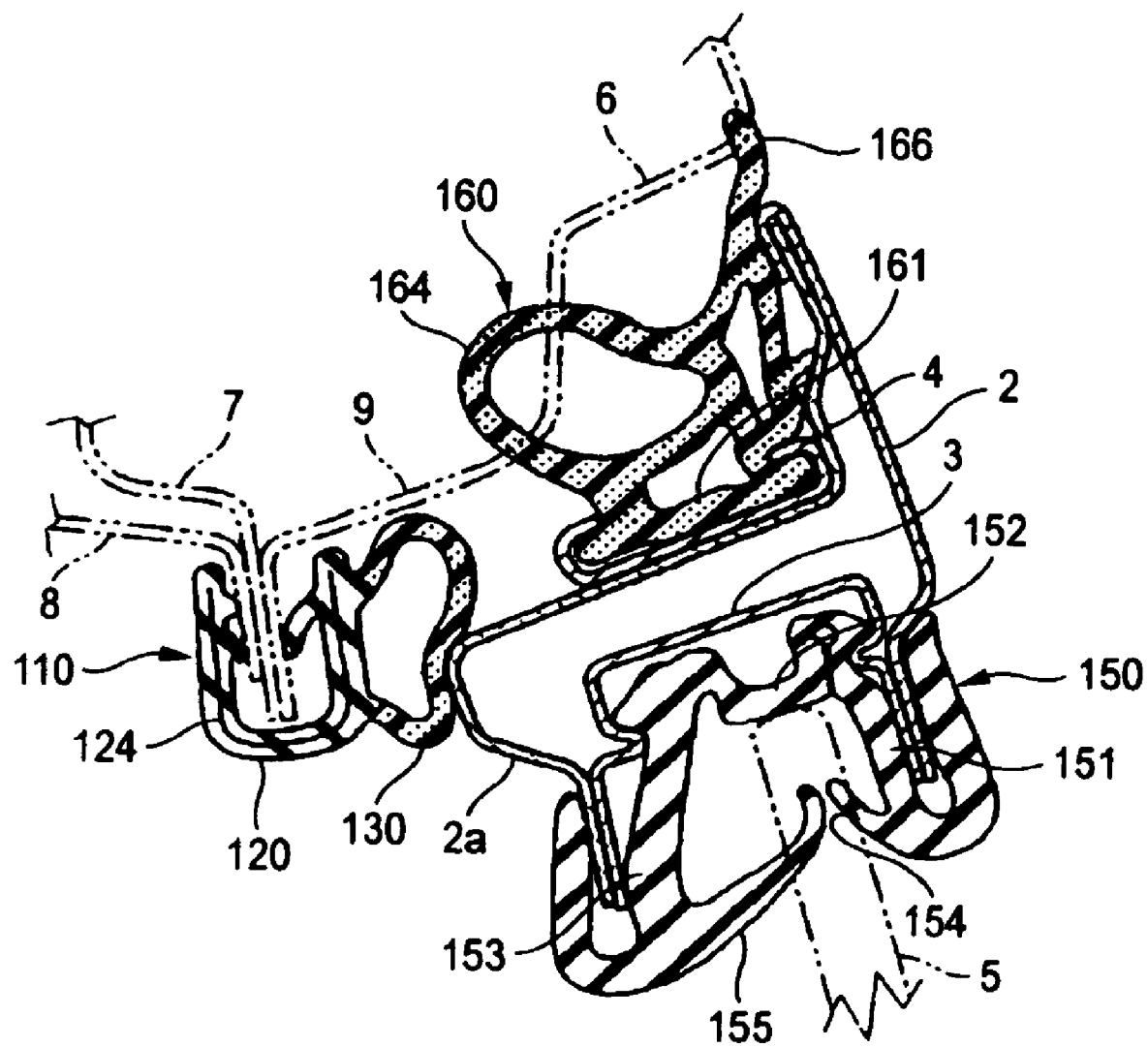
FIG. 5 is a cross-sectional view showing a conventional seal structure at a peripheral part of an opening portion of an automobile.
Figure 6:
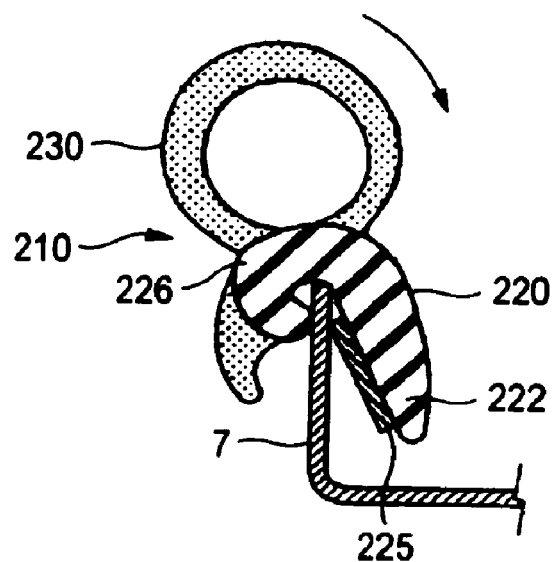
FIG. 6 a cross-sectional view showing a condition in which another conventional door opening trim weather strip is attached to a flange of an automobile by a double adhesive tape.
Figure 7:
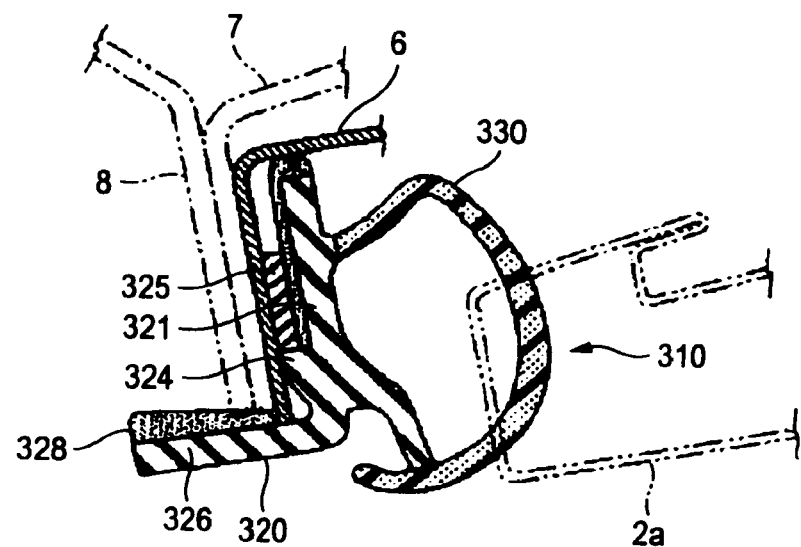
FIG. 7 is a cross-sectional view showing a condition in which a further conventional door opening trim weather strip is attached to a flange of an automobile by a double adhesive tape.

FIG. 1 is a cross-sectional view of a first embodiment of an opening trim weather strip 10 of the invention taken along the line A-A of FIG. 4, showing a condition in which this weather strip 10 is attached to a peripheral part 6 of a vehicle body opening shown in FIG. 3.

Figure 2:
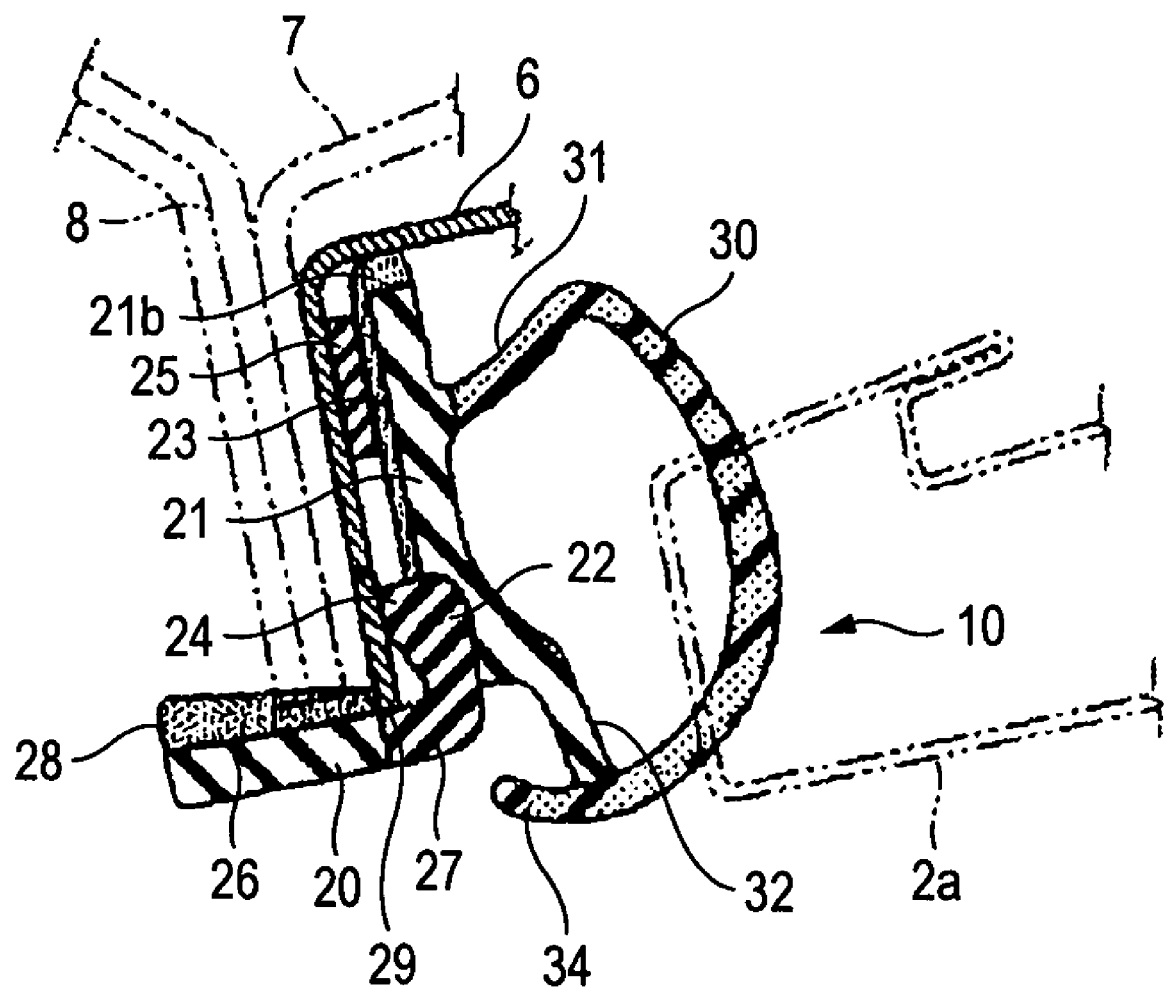
FIG. 2 is a cross-sectional view of a second embodiment of an opening trim weather strip of the invention taken along the line A-A of FIG. 4, showing a condition in which this weather strip is attached to the peripheral part of the vehicle body opening.

FIG. 2 is a cross-sectional view of a second embodiment of an opening trim weather strip 10 of the invention taken along the line A-A of FIG. 4, showing a condition in which this weather strip 10 is attached to the peripheral part 6 of the vehicle body opening shown in FIG. 3.

FIG. 3 is a perspective view of a vehicle body 1 as seen obliquely from the rear side thereof in an open condition of a door 2 of the automobile, showing a condition in which the opening trim weather strip 10 is attached to the peripheral part 6.

FIG. 4 is a front-elevational view showing the whole of the opening trip weather strip 10 to be attached to the peripheral part 6.

As shown in FIG. 3, the vehicle body 1 has vehicle body openings, and the vehicle body opening is closed and opened by the door 2 which is the opening/closing member. The periphery of the vehicle body opening defines the peripheral part 6, and distal end portions of an outer panel 9, an inner panel 8, etc., (which form the vehicle body 1) are welded together at the peripheral part 6 to form a flange 7 (see FIGS. 1 and 2). The opening trim weather strip 10 which seals between the peripheral part 6 and the door 2 is attached to the flange 7.

The number of the panels welded together to form the flange 7 varies from 2 to 5 from one region of the peripheral part 6 of the vehicle body 1 to another, and therefore the thickness of the flange 7 also varies depending on the region of the vehicle body 1.

The opening trim weather strip 10 is molded into a linear configuration by extrusion. The single opening trim weather strip 10 thus formed into the linear shape is formed into an annular shape by a connecting portion 11, as shown in FIG. 3, and is attached to the flange 7 in conformity with the shape of the peripheral part 6 as shown in FIG. 3. Alternatively, opposite ends of the opening trim weather strip 10 may be bonded together by an adhesive so as to form an annular shape before it is attached to the flange. When the weather strip is thus formed into an annular shape, it can be easy attached to the opening/closing member or the peripheral part 6.

The attaching operation may be effected by a method in which the linear opening trim weather strip 10 which is not beforehand formed into an annular shape is attached to the flange 7 sequentially from one end thereof, and after this attaching operation is finished, the other end of the weather strip 10 is joined to the one end thereof.

Next, the cross-sectional shape of the opening trim weather strip 10 of the first embodiment will be described with reference to FIG. 1.

The opening trim weather strip 10 includes a trim portion (attaching base portion) 20 of a generally L-shaped cross-section adapted to be attached to the flange 7, and a hollow seal portion 30 of a hollow shape formed integrally with the trim portion 20 and adapted to contact with a door frame bulge portion 2a of the door 2 to seal between the door 2 and the peripheral part 6. The trim portion 20 of the generally L-shaped cross-section includes an exterior side wall 21, and a bottom wall 26.

The hollow seal portion 30 is formed integrally on an exterior surface of the exterior side wall 21. The hollow seal portion 30 is formed by a hollow sponge material of a generally oval shape formed on the exterior surface of the exterior side wall 21. Sponge rubber, sponge thermoplastic elastomer or the like is used as the sponge material. When the door 2 is closed, the hollow seal portion 30 contacts, for example, with the door frame bulge portion 2a of the door 2 to seal between the door 2 and the peripheral part 6. A garnish may be attached to the door frame bulge portion 2a in order to enhance the appearance, in which case the hollow seal portion 30 contact with the garnish.

The hollow seal portion 30 includes a first hollow connecting portion 31 extending from a location of the exterior surface of the exterior side wall 21 closer to the distal end of the exterior side wall 21 than a central portion of thereof, a second connecting portion 32 extending from the exterior surface of the exterior side wall 21 in the vicinity of the interconnecting portion of the exterior side wall 21 and the bottom wall 26, a sealing contact portion 33 of a generally arc-shaped cross-section continuous at its opposite ends respectively with a distal end of the first hollow connecting portion 31 and a distal end of the second hollow connecting portion 32, and a cover lip portion 34 extending from the distal end of the sealing contact portion 33 toward the bottom portion 26 to cover a root portion of the second hollow connecting portion 32. Therefore, the first hollow connecting portion 31, the sealing contact portion 33 and the second hollow connecting portion 32 jointly form the hollow seal portion 30 of a hollow shape.

The trim portion 20 is formed into the generally L-shaped cross-section by the exterior side wall 21 and the bottom wall 26 as described above, and can be applied despite a change in thickness of the flange 7, and therefore the bottom wall 26 has a predetermined width. The exterior side wall 21 and the bottom wall 26 of the trim portion 20 are formed integrally with each other in a continuous manner, and any insert (core member) made of a metal sheet, a hard (or rigid) synthetic resin or other material and reinforcing a holding force used to hold the flange 7 is not embedded in the trim portion 20. Therefore, a lightweight design of the opening trim weather strip 10 can be achieved.

The exterior side wall 21 of the trim portion 20 is formed into a generally flat plate-shaped cross-section, and a double adhesive tape 25 is bonded to an interior surface of the exterior side wall 21. The exterior side wall 21 of the opening trim weather strip 10 is bonded to a side surface of the flange 7 by the double adhesive tape 25.

With the use of the double adhesive tape 25, the weather strip need only to be bonded to the exterior surface of the flange 7, therefore, the same attaching method can be used, and the same strength of bonding of the trim portion 20 to the flange 7 can be obtained, even when the thickness of the flange 7 varies. In addition, the attaching operation is easy. Further, when the double adhesive tape 25 is bonded to the exterior side wall 21, a large bonding area is formed, and therefore the trim portion 20 can be firmly bonded to the flange 7.

A sponge layer 23 can be formed between the interior surface of the exterior side wall 21 and the double adhesive tape 25 at a region extending from an elongation/shrinkage prevention portion 22 (described later) toward the distal end of the exterior side wall 21. In this case, when the double adhesive tape 25 is bonded to the flange 7, the sponge layer 23 absorbs irregularities on the side surface of the flange due to spot welding traces or the like, so that the double adhesive tape 25 can be firmly bonded to the exterior side wall 21.

An exterior side wall distal end portion 21b at the distal end of the exterior side wall 21 may be formed of a sponge material integral with the sponge layer 23. When the exterior side wall 21 is attached to the flange 7, the exterior side wall distal end portion 21b contact with a bent portion of the outer panel 9 to seal between the outer panel 9 and the opening trim weather strip 10.

The double adhesive tape 25 is bonded at least to a region on the interior surface of the exterior side wall 21 defined between the distal end of the exterior side wall 21 and the portion at which the first hollow connecting portion 31 is connected to the exterior side wall 21. In the first embodiment, the double adhesive tape 25 is bonded to that portion of the exterior side wall 21 extending from the distal end of the exterior side wall 21 to an exterior side wall projection portion 24 (described later). Therefore, the double adhesive tape 25 can be bonded to the side surface of the exterior side wall 21, including the distal end-side portion thereof, over a wide area thereof. Therefore, even if welding traces such as spot welding traces exist at the side surface of the flange 7, the double adhesive tape 25 can be firmly bonded while avoiding these welding traces, since the welding traces do not exist at the root portion of the flange 7.

The side face of the exterior side wall 21 continuous with the bottom wall 26 is made of a hard (or, rigid) material having an IRHD value of 90° to 95°, and is formed integrally with the bottom wall 26 as described later. The elongation/shrinkage prevention portion 22 of an increased thickness is formed at a location on the exterior side wall 21 slightly closer to the interconnection portion of the exterior side wall 21 and the bottom wall 26 than the central portion of the exterior side wall 21. When the trim portion 20 is attached to a corner portion of the peripheral part 6, the exterior side wall 21 is curved in the widthwise direction. However, the elongation/shrinkage prevention portion 22 is formed into an increased thickness, using the hard material having the IRHD value of 90° to 95°, and therefore the elongation/shrinkage prevention portion 22 serves as a neutral axis of curvature. Namely, at the corner portion, the portion of the exterior side wall 21 extending toward its distal end from the elongation/shrinkage prevention portion 22 is elongated while the portion of the exterior side wall 21 extending from the elongation/shrinkage prevention portion 22 toward the bottom wall 26 is compressed or shrunk, and the elongation/shrinkage prevention portion 22 is not elongated and is not compressed or shrunk.

A reinforcing thread material 22b may be embedded in the elongation/shrinkage prevention portion 22. A thread made of aramid fiber, nylon fiber or polyester fiber can be used as the reinforcing thread material 22b, and alternatively a metal wire made of stainless steel or copper or the like can be used.

The reinforcing thread material 22b is embedded in the elongation/shrinkage prevention portion 22, and further the elongation/shrinkage prevention portion 22 is made of the hard material, and therefore the amount of elongation and shrinkage of the elongation/shrinkage prevention portion 22 is small. When the trim portion 20 is attached in a curved manner to the corner portion, the elongation/shrinkage prevention portion 22 positively serves as the neutral axis of curvature of the trim portion 20. In the case where the metal wire is embedded in the elongation/shrinkage prevention portion 22, the adhesion of the metal wire to the elongation/shrinkage prevention portion 22 is secured by an adhesively-bonding process or the like, and the elongation/shrinkage prevention portion 22 has a low elongation/shrinkage ability and a high strength, and therefore can suppress the elongation and shrinkage of the opening trim weather strip 10. In the case of using the reinforcing thread material 22b, the elongation/shrinkage prevention portion 22 has flexibility, a low elongation/shrinkage ability and a high strength, and therefore can suppress the elongation and shrinkage of the opening trim weather strip.

Therefore, when the opening trim weather strip 10 is attached to the corner portion, the hollow seal portion 30 is deformed, and particularly the first hollow connecting portion 31 and its vicinities are much elongated, so that the first hollow connecting portion 31 pulls the distal end portion of the exterior side wall 21. However, the double adhesive tape 25 is located at the distal end portion of the exterior side wall 21, and the exterior side wall 21 is bonded to the flange 7 even at the region extending from the first hollow connecting portion 31 toward the distal end of the exterior side wall 21, and therefore the distal end portion of the exterior side wall 21 will not be peeled off the flange 7.

As described above, the exterior side wall distal end portion 21b may be formed at the distal end of the exterior side wall 21 by the sponge material extending continuously from the sponge layer 23. The exterior side wall distal end portion 21b contact with the root portion of the flange 7 to seal between the flange 7 and the opening trim weather strip 10.

When the opening trim weather strip 10 is attached to the corner portion, the bottom wall 26 (described later) is bent in a direction to contact with the distal end of the flange 7, and is pressed against the distal end of the flange 7, so that the seal between the distal end of the flange 7 and the bottom wall 26 is enhanced.

Incidentally, the elongation/shrinkage prevention portion 22 is larger in thickness than the distal end-side portion of the exterior side wall 21, and therefore the step-like exterior side wall projection portion 24 is formed on the interior surface of the exterior side wall 21. In the case where the double adhesive tape 25 is wide, the side end portion of the double adhesive tape 25 is bonded to the exterior side wall 21 along a side surface of the step-like exterior side wall projection portion 24, and by doing so, the positioning of the double adhesive tape 25 can be effected. Thus, the double adhesive tape 25 can be bonded to the predetermined position of the flange 7.

Like the elongation/shrinkage prevention portion 22, an interconnecting portion 27 interconnecting the exterior side wall 21 and the bottom wall 26, as well as the bottom wall 26 (described later), is made of a hard (or rigid) material having an IRHD value of 90° to 95°. Therefore, even when the distal end of the flange 7 contact with the bottom wall 26, the angle between the bottom wall 26 and the exterior side wall 21 is hardly increased, and the satisfactory seal between the distal end of the flange 7 and the bottom wall 26 can be secured.

The portion of the exterior side wall 21 extending toward its distal end from the elongation/shrinkage prevention portion 22 is formed by a solid material having an IRHD value of 65° to 75°. Therefore, when the trim portion 20 is attached in a curved manner to the corner portion as described above, the distal end-side portion of the exterior side wall 21 is elongated, so that the elongation/shrinkage prevention portion 22 can positively serve as the neutral axis of curvature. Further, the exterior side wall 21 has sufficient hardness, and therefore is stable in configuration, and positively holds the hollow seal portion 30 (described later), thereby securing the sealing performance.

The bottom wall 26 is formed into a generally flat plate-shape, and a portion of the bottom wall 26 located near to the interconnecting portion 27 interconnecting the bottom wall 26 and the exterior side wall 21 is made of a hard (or rigid) material. The hard material is integrally formed to extend continuously from the elongation/shrinkage prevention portion 22 of the exterior side wall 21 to the distal end of the bottom wall 26.

Even when the distal end of the flange 7 is abutted against the bottom wall 26, the bottom wall 26 is hardly deformed, and can determine the position where the exterior side wall 21 is bonded to the flange 7, and also the bottom wall 26 can positively retain the flange 7.

Further, the sound insulating sponge 28 as a sound insulating member is provided on the surface of the bottom wall 26 with which the flange 7 contacts. In this embodiment, the sound insulating sponge 28 has a hollow shape and a triangular cross-section, and the sound insulating sponge 28 is bonded to the bottom wall 26 in such a manner that a distal end of the sound insulating sponge 28 disposed at the root portion of the bottom wall 26 is slightly offset toward the distal end of the bottom wall 26 to thereby form a bottom wall step portion 29 at which the sound insulating sponge 28 does not exist on the bottom wall 26. Therefore, the outer panel 9 of the flange 7 which is slightly longer than the other panels can directly contact at its distal end with the bottom wall 26 to be retained by this bottom wall 26, thereby positioning the flange 7, and also this can determine the position where the double adhesive tape 25 is bonded to the exterior side wall 21. Incidentally, the bottom wall step portion 29 may be formed in a step-like shape with an L-shaped cross-section on the bottom wall 26.

Since the sound insulating sponge 28 is made of sponge, a distal part of the flange 7 except the distal end of the outer panel 9 can be embedded in the sound insulating sponge 28 in an embracing manner. In the case where the flange 7 is formed by joining the panels by spot welding or the like, a gap is formed between any two adjacent panels of the flange 7. However, noises and rain water is prevented from leaking through the gap at the distal ends of any two adjacent panels. Further, the sound insulating sponge 28 can seal dust and noises which would otherwise intrude from the exterior into a gap between the distal end of the flange 7 and the bottom wall 26.

Hard rubber or a hard synthetic resin can be used as the above hard material. Hard EPDM rubber or the like having an IRHD value of 90° to 95° can be used as the hard rubber. Hard polyethylene, hard polypropylene or the like can be used as the hard synthetic resin. Also, hard olefin thermoplastic elastomer having an IRHD value of 90° to 95° can be used.

These hard materials elongate and shrink in a small amount in the longitudinal direction. When attaching the opening trim weather strip 10 to the flange 7, the amount of elongation relative to the flange 7 is small, and part of the opening trim weather strip 10 will not be lifted off the flange 7, and also the opening trim weather strip 10 will not be wrinkled.

In the molding of the opening trim weather strip 10, in the case where the hard portions are formed by the use of the above hard material (hard EPDM rubber, hard polyethylene, hard polypropylene, etc.) while the other portion is formed by soft EPDM rubber and olefin thermoplastic elastomer, these portions can be simultaneously molded by an extruding machine.

Preferably, the widthwise dimension of the double adhesive tape 25 used in the invention is at least ¼ to 1 of the widthwise dimension of the exterior side wall 21. With this widthwise dimension, when the opening trim weather strip 10 is bonded to the flange 7 by the double adhesive tape 25, a high bonding strength can be secured. If the widthwise dimension of the double adhesive tape 25 is smaller than ¼ of the widthwise dimension of the exterior side wall 21, a sufficient bonding strength can not be obtained. In contrast, if the widthwise dimension of the double adhesive tape 25 is larger than 1 of the widthwise dimension of the exterior side wall 21, the double adhesive tape 25 projects from the opening trim weather strip 10, and portions of the double adhesive tape 25 overlap each other to form step portions.

A concave portion is formed between the portion of the exterior side wall 21 to which the double adhesive tape 25 is bonded and the elongation/shrinkage prevention portion 22, and therefore the spot welding traces formed on the flange 7 and a strain due to the spot welding can be absorbed by this concave portion. Therefore, the bonding strength of the double adhesive tape by which the opening trim weather strip 10 is attached to the flange 10 can be secured.

When the opening trim weather strip 10 of the first embodiment is to be attached to the flange 7, first, the trim portion 20 of the opening trim weather strip 10 is disposed in inclined relation to the flange 7, and the distal end of the flange 7 is brought into contact with the bottom wall 26. In this case, the trim portion 20 has no interior side wall, and therefore the flange 7 can be inclined relative to the trim portion 20, and can be inserted.

At this time, the most exterior outer panel 9 of the flange 7 contacts at its distal end with the bottom wall step portion 29 since this outer panel 9 is slightly longer than the other panels of the flange 7. At this time, the side surface of the outer panel 9 contact with the exterior side wall projection portion 24.

Thereafter, the trim portion 20 is rotated or angularly moved, thereby pressing the double adhesive tape 25 against the side surface of the flange 7. Then, the hollow seal portion 30 is pressed by a roller, thereby bonding the double adhesive tape 25 to the flange 7.

Next, the cross-sectional shape of the opening trim weather strip 10 of the second embodiment will be described with reference to FIG. 2. The second embodiment differs from the first embodiment only in that a double adhesive tape 25 is bonded only to a distal end-side portion of an exterior side wall 21, and different points will be mainly described, and explanation of similar portions to those of the first embodiment will be omitted.

In the second embodiment, as shown in FIG. 2, the double adhesive tape 25 is bonded to a region on an interior surface of the exterior side wall 21 defined between the distal end of the exterior side wall 21 and a position where a first hollow connecting portion 31 is connected to the exterior side wall 21. Since the double adhesive tape 25 is bonded only to the distal end-side portion of the exterior side wall 21, a distal end of the flange 7 is hardly brought into contact with the double adhesive tape 25, and it can be positively brought into contact with a bottom wall 26 when attaching a trim portion 20 to a flange 7. Accordingly, the positioning of the distal end of the flange 7 can be effected easily. Further, the amount of the double adhesive tape 25 is smaller, and the cost can be reduced.

In each of the above embodiments, although the bottom plate 26 has the flat plate-like shape, it may have a gently convexly curved surface (that is, may have a generally semi-cylindrical shape). Further, the trim portion may have a short interior side wall and a cover lip.

Next, a method of producing the opening trim weather strip 10 will be described.

This opening trim weather strip 10 is molded by extrusion, and solid rubber for forming the trim portion 20 and sponge rubber for forming the hollow seal portion 30 can be extruded in an integral manner by an extruding machine.

In the case of embedding the reinforcing thread material 22b in the elongation/shrinkage prevention portion 22 of the trim portion 20, the trim portion 20 and the hollow seal portion 30 are simultaneously extruded.

In the case of synthetic rubber, an extruded product is transferred to a vulcanizing vessel, and is heated by hot air, high-frequency heating means or the like, and is subjected to vulcanization and foaming. In the case of thermoplastic elastomer or soft synthetic resin, a product is heated to be foamed simultaneously with or after it is extruded, and then is cooled to be solidified. Thereafter, the product is cut into a predetermined length to produce the extruded part.

The extruded opening trim weather strip 10 is cut into a predetermined length, and may be formed into an annular shape by connecting means, and this opening trim weather strip 10 is attached to the flange 7 at the peripheral part of the vehicle body opening.

What is claimed is:

1. A weather strip for sealing between a opening/closing member of a vehicle and a peripheral part of a vehicle body opening of the vehicle, comprising:
    an attaching base portion adapted to be attached to a flange formed at one of the opening/closing member and the peripheral part; and
    a hollow seal portion formed integrally with the attaching base portion and adapted to contact against the other of the opening/closing member and the peripheral part to seal between the opening/closing member and the peripheral part;
    the attaching base portion includes at least a bottom wall and an exterior side wall to define a generally L-shaped cross section;
    wherein an elongation/shrinkage prevention portion is formed in the exterior side wall such that a neutral plane of curvature when the attaching base portion is curved in a widthwise direction thereof is located at a position closer to a widthwise distal end of the exterior side wall than an interconnecting portion between the exterior side wall and the bottom wall;
    the hollow seal portion includes a sealing contact portion for contacting with the other of the opening/closing member and the peripheral part, a first hollow connecting portion interconnecting one side end of the sealing contact portion and an exterior surface of the exterior side wall located at a position closer to the widthwise distal end of the exterior side wall than the elongation/shrinkage prevention portion, and a second hollow connecting portion interconnecting another side end of the sealing contact portion and the exterior surface of the exterior side wall located at a root portion of the exterior side wall; and
    a double adhesive tape is bonded at least to a region on an interior side surface of the exterior side wall defined between a widthwise distal end of the exterior side wall and a portion at which the first hollow connecting portion and the exterior side wall are interconnected.

2. A weather strip according to claim 1, wherein the double adhesive tape is bonded to a region on the interior surface of the exterior side wall defined between the widthwise distal end of the exterior side wall to the elongation/shrinkage prevention portion.

3. A weather strip according to claim 1, wherein a sponge layer is formed between the interior surface of the exterior side wall and the double adhesive tape.

4. A weather strip according to claim 1, wherein the elongation/shrinkage prevention portion comprises a material harder than remaining portions of the exterior side wall, and is thickened.

5. A weather strip according to claim 1, wherein a reinforcing thread material or a metal wire is embedded in the elongation/shrinkage prevention portion.

6. A weather strip according to claim 1, wherein a widthwise dimension of the double adhesive tape is at least ¼ to 1 of a widthwise dimension of the exterior side wall.

7. A weather strip according to claim 1, wherein a concave portion is formed between the region to which the double adhesive tape is bonded and the elongation/shrinkage prevention portion.

8. A weather strip according to claim 1, wherein the opening/closing member comprises a door, and the weather strip comprises an opening trim weather strip.

* * * * *